United States Patent
Zhang (10) Patent No.: US 8,004,247 B1
(45) Date of Patent: Aug. 23, 2011

(54) SWITCHABLE BATTERY CHARGER CIRCUIT

(75) Inventor: Hong Liang Zhang, Choa Chu Kang (CN)

(73) Assignee: Marvell International Ltd., Hamilton (BM)

( * ) Notice: Subject to any disclaimer, the term of this patent is extended or adjusted under 35 U.S.C. 154(b) by 665 days.

(21) Appl. No.: 12/110,028

(22) Filed: Apr. 25, 2008

Related U.S. Application Data (60) Provisional application No. 60/914,113, filed on Apr. 26, 2007.

(51) Int. Cl.
   *H02J 7/00*   (2006.01)
   *H02J 1/10*   (2006.01)
(52) U.S. Cl. ........ 320/138; 320/134; 320/137; 320/162; 307/43; 307/80
(58) Field of Classification Search ................... 320/138
   See application file for complete search history.

(56) References Cited

U.S. PATENT DOCUMENTS

| | | | |
|---|---|---|---|
| 7,023,179 B2 * | 4/2006 | Nagai et al. | 320/152 |
| 7,414,332 B2 * | 8/2008 | Ohsuga | 307/80 |
| 7,498,694 B2 * | 3/2009 | Luo et al. | 307/82 |
| 2007/0001646 A1 * | 1/2007 | Kojima | 320/128 |

* cited by examiner

*Primary Examiner* — Edward Tso
*Assistant Examiner* — Johali A Torres Ruiz (57) ABSTRACT

In one or more embodiments, a battery charger switching circuit enables a device to automatically select between multiple device interfaces individual ones of which are connectable to different power supplies for recharging the device. In at least some embodiments, selection of a particular device interface is based upon the magnitude of the voltage associated with a particular power supply. For example, the battery charger switching circuit can ascertain charge voltages associated with individual power supplies and select a power supply having a greater magnitude of charge voltage. In at least some embodiments, the battery charger switching circuit can enable charge control circuits associated with a particular power supply and disable charge control circuits associated with unselected power supplies in a manner that reduces or eliminates leakage current associated with unselected power supplies.

20 Claims, 7 Drawing Sheets

SWITCHABLE BATTERY CHARGER CIRCUIT

RELATED APPLICATION

This application claims priority to U.S. Provisional Application No. 60/914,113, filed on Apr. 26, 2007, the disclosure of which is incorporated by reference herein.

BACKGROUND

Most if not all portable consumer devices such as personal digital assistants (PDAs), cell phones, personal computing devices, and the like, employ some type of battery to provide power to the device. When a device's power runs low, the consumer can typically recharge the device's battery using some type of adapter to a power supply. For example, typical adapters can include AC adapters that are connected to a device via an AC interface and USB adapters that are connected to a device via a USB interface such as a USB port.

These devices typically require a user to select the means by which a device is recharged. Accordingly, the user typically has to select one specific adapter and connect the adapter between the power supply and the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a method comprises: ascertaining voltage magnitudes associated with battery charging sources; enabling, based on the ascertained voltage magnitudes, charge circuitry associated with one of the battery charging sources; and disabling additional charge circuitry associated with at least one other battery charging source.

In one or more other embodiments, a battery charger circuit comprises: voltage detection circuitry configured to ascertain voltage magnitudes associated with battery charging sources; charge circuitry configured to enable a battery to be charged from one of the battery charging sources; charge enable circuitry configured to: enable, based on voltage magnitudes ascertained by the voltage detection circuitry, charge circuitry associated with one of the battery charging sources; and disable additional charge circuitry associated with at least one other battery charging source.

In one or more other embodiments, a battery charger circuit comprises: means for ascertaining voltage magnitudes associated with battery charging sources; means for enabling, based on ascertained voltage magnitudes, charge circuitry associated with one of the battery charging sources; and means for disabling additional charge circuitry associated with at least one other battery charging source.

BRIEF DESCRIPTION OF THE DRAWINGS

The same numbers are used throughout the drawings to reference like features.

DETAILED DESCRIPTION

Overview

In one or more embodiments, a battery charger switching circuit enables a device to automatically select between multiple device interfaces, individual ones of which are connectable to different power supplies or battery charging sources, for recharging the device. In at least some embodiments, selection of a particular device interface is based upon the magnitude of the voltage associated with a particular power supply. For example, the battery charger switching circuit can ascertain charge voltages associated with individual power supplies and select a power supply having a greater magnitude of charge voltage. In at least some embodiments, the battery charger switching circuit can enable charge control circuits associated with a particular power supply and disable charge control circuits associated with unselected power supplies in a manner that reduces or eliminates leakage current associated with unselected power supplies.

In the discussion that follows, a section entitled "Operating Environment" is provided and describes one example operating environment in which one or more embodiments can be employed. Following this, a section entitled "Implementation Example" provides a description of an example implementation in accordance with one or more embodiments. Following this, a section entitled "Example Method" is provided and describes an example method in accordance with one or more embodiments. Last, a section entitled "Implementation Environments" is provided and describes some example environments in which the inventive techniques can be employed in one or more embodiments.

Operating Environment

Figure 1:
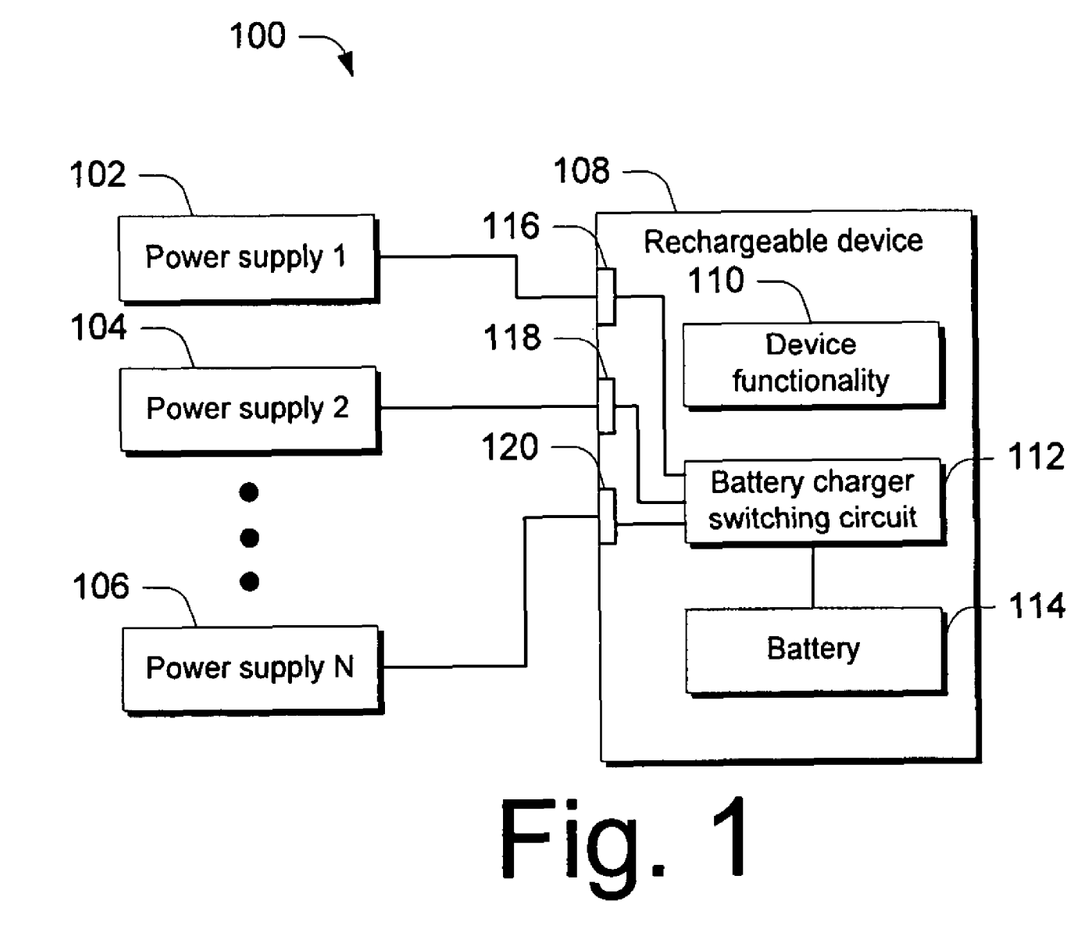
FIG. 1 illustrates an example operating environment in accordance with one or more embodiments.

FIG. 1 illustrates an example operating environment in accordance with one or more embodiments generally at 100. Operating environment 100 includes, in this example, multiple different power supplies 102, 104, and 106. Any suitable number of power supplies and power supply types can be utilized, examples of which are provided below.

In addition, the operating environment 100 includes a rechargeable device 108. Rechargeable devices can include, by way of example and not limitation, personal digital assistants (PDAs), cell phones, portable computing devices, digital cameras, portable MP3 and MP4 players, charging docks and cradles, and the like. Rechargeable device 108 includes device functionality 110 that is specific to the device type. For example, if the rechargeable device 108 comprises a personal digital assistant, the device functionality 110 would include functionality that is normally associated with a personal digital assistant. Likewise, if the rechargeable device 108 comprises a cell phone, the device functionality 110 would include functionality that is normally associated with a cell phone. Example implementation environments in accordance with one or more embodiments are described below. In addition, rechargeable device 108 includes a battery charger switching circuit 112 and an associated battery 114. Any suitable type of battery can be used, an example of which is a lithium-ion battery. Such batteries can typically be charged to 4.2 V within given tolerances. Further, the rechargeable device 108 includes multiple interfaces 116, 118, and 120 which serve as an interface between an associated power supply and battery charger switching circuit 112.

In this particular example, interface 116 is associated with power supply 102, interface 118 is associated with power supply 104, and interface 120 is associated with power supply 106.

The battery charger switching circuit 112 can be implemented using any suitable arrangement of hardware or firmware. In at least some embodiments, the battery charger switching circuit 112 can be integrated in a chip set associated with rechargeable device 108.

In operation, the battery charger switching circuit 112 enables device 108 to automatically select between multiple device interfaces, such as interfaces 116, 118, and 120, individual ones of which are connectable to different power supplies for recharging the device.

Implementation Example

Figure 2:
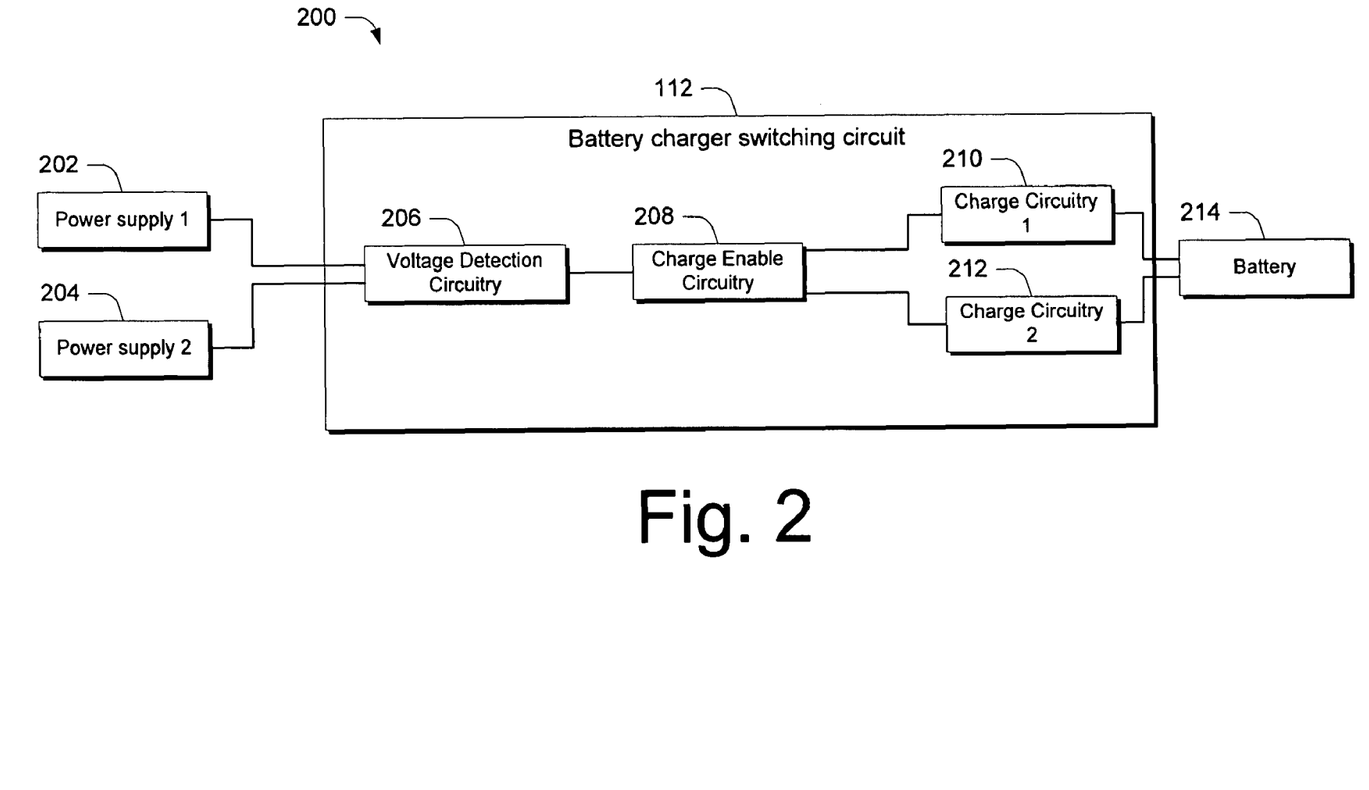
FIG. 2 illustrates an example system in accordance with one or more embodiments.

FIG. 2 illustrates an example system in accordance with one or more embodiments generally at 200. In this example, and for ease of explanation, only two power supplies 202, 204 are shown. More generally, any suitable number of power supplies can be utilized. In this particular example, battery charger switching circuit 112 includes voltage detection circuitry 206 operably coupled between power supplies 202, 204 and charge enable circuitry 208. The charge enable circuitry 208 is coupled with charge circuitry 210, 212. In turn, the charge circuitry is operably coupled with a battery 214.

In operation, the voltage detection circuitry 206 is configured to ascertain voltage magnitudes associated with power supplies 202, 204. Based on ascertained voltage magnitudes, the charge enable circuitry 208 can selectively, automatically enable one of its output lines to effectively select a device interface through which the battery can be charged, e.g. by coupling associated charge circuitry, such as charge circuitry 210, 212 with an associated power supply. In turn, the charge circuitry can then be used to, e.g., charge a battery 214 or provide power to other circuitry within a device.

Figure 3:
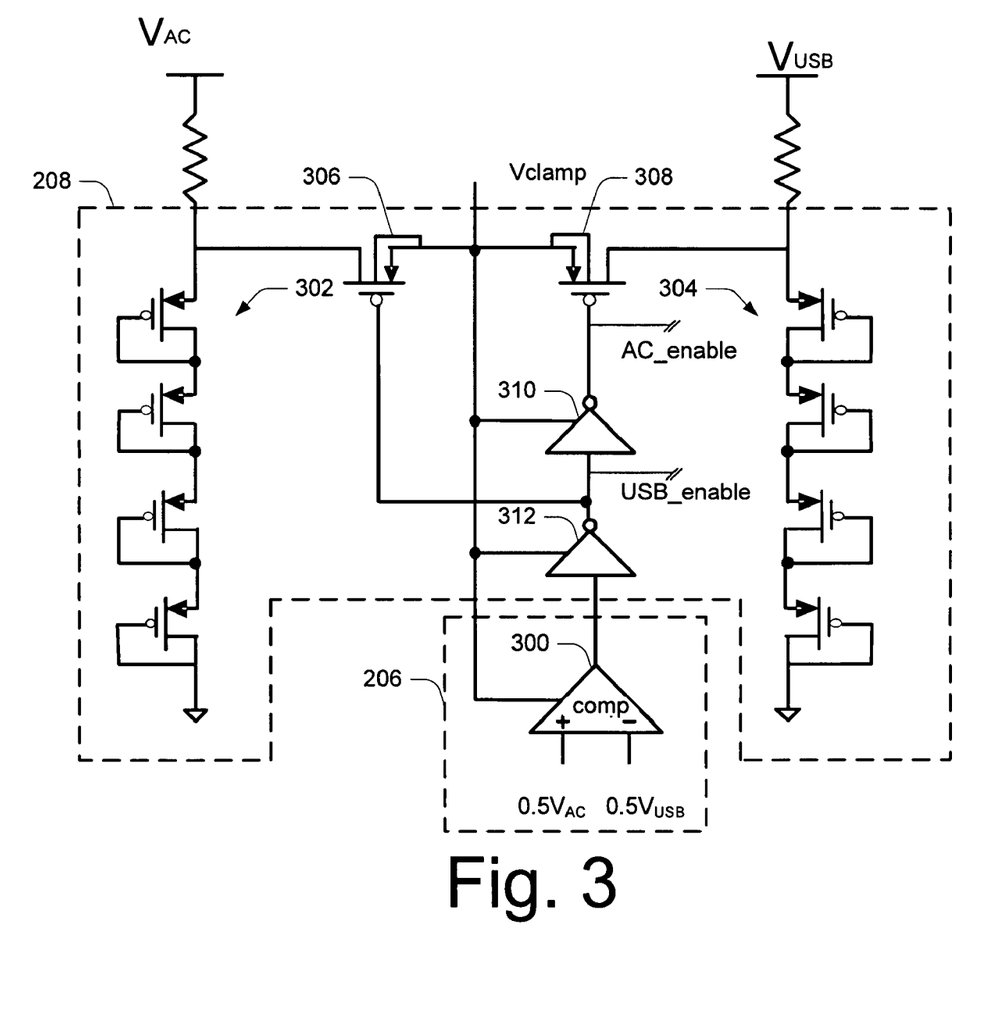
FIG. 3 illustrates a specific arrangement of voltage detection circuitry and charge enable circuitry in accordance with one or more embodiments.
Figure 4:
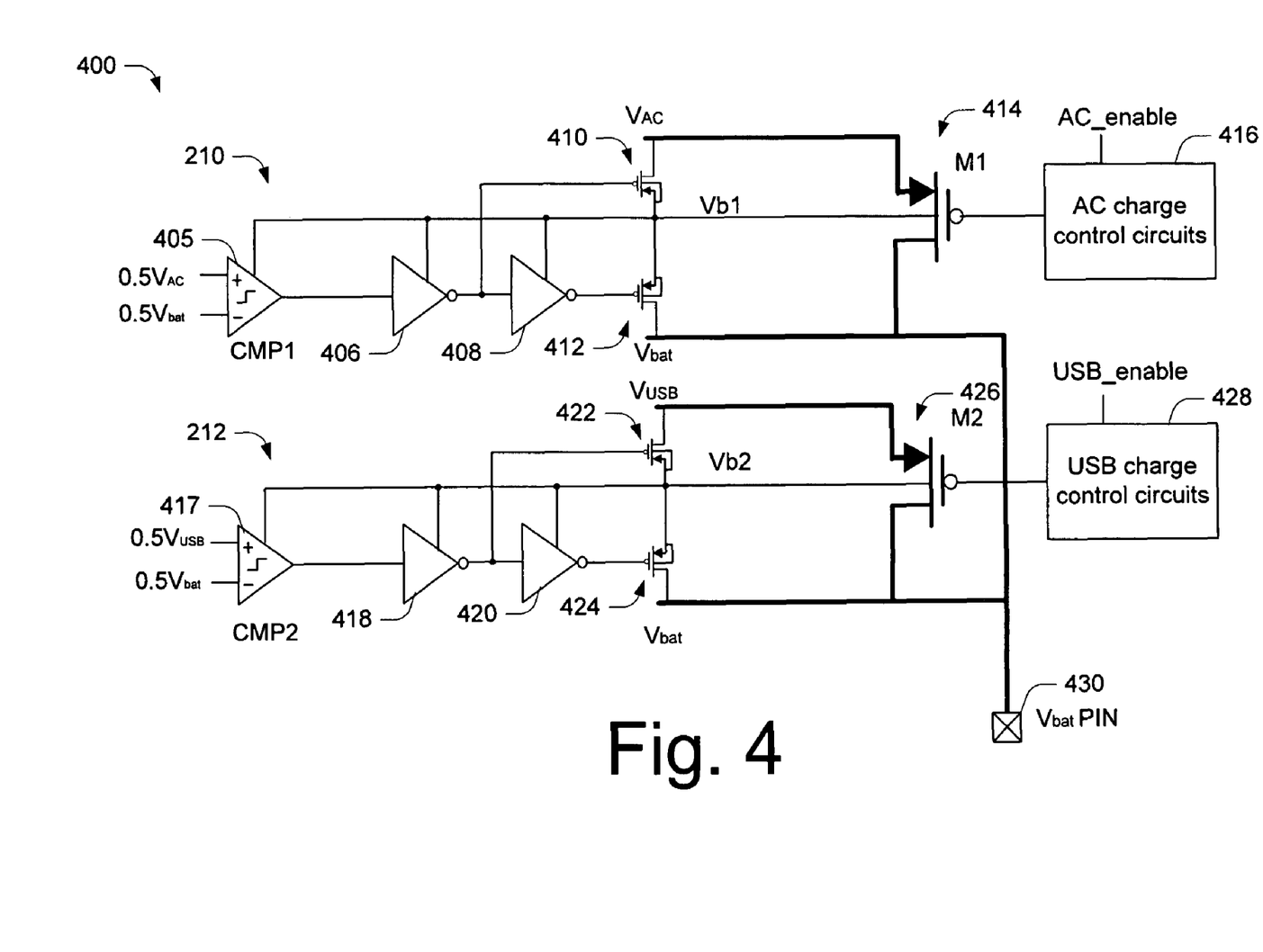
FIG. 4 illustrates a specific arrangement of charge circuitry in accordance with one or more embodiments.

FIGS. 3 and 4 provide more details of the circuitry illustrated in FIG. 2 in accordance with one or more embodiment. Specifically, FIG. 3 illustrates a specific arrangement of voltage detection circuitry 206 and charge enable circuitry 208. FIG. 4 illustrates a specific arrangement of charge circuitry 210, 212.

In the FIG. 3 example, the power supplies are associated with an AC voltage source $V_{AC}$, and a USB voltage source $V_{USB}$. In this example, the voltages associated with these voltage sources can vary. For example, the USB voltage source can vary up to a maximum of about 5.5 V, whereas the AC voltage source can vary up to about 9 V. In this embodiment, the illustrated circuitry serves to provide a pair of enable signals, e.g., AC_enable and USB_enable, as well as to provide an AC-clamping circuit as will be described below. In this particular example, voltage detection circuitry 206 includes a comparator 300 that includes inputs associated with each of the power supplies.

The charge enable circuitry 208 includes two assemblies of interconnected PMOS transistors 302, 304 respectively. The PMOS transistor assemblies are connected between ground and a respective associated power supply through a resistor as shown. PMOS transistors 306, 308 are connected between transistor assemblies 302, 304 respectively, and a pair of inverters 310, 312. A node connecting PMOS transistors 306, 308 is used to drive inverters 310, 312 as well as comparator 300.

Inverter 312 receives, as its input, the output of comparator 300. The output of inverter 312, which is provided as input to inverter 310, is tied to the gate of PMOS transistor 306 as shown. The output of inverter 310 is tied to the gate of PMOS transistors 308.

In operation, this circuit can be used to provide an AC voltage clamp that can be used to bias charge control circuits described below. In this example, if the AC voltage is higher than the USB voltage, the output of comparator 300 is high. Accordingly, the output of inverter 312 is low (corresponding to a low or disabled USB_enable line) and the output of inverter 310 is high (corresponding to a high or enabled AC_enable line). When this happens, transistor 306 is turned on and transistor 308 is turned off. With transistor 306 turned on, PMOS transistor assembly 302 effectively provides an AC clamping circuit that clamps the charge voltage to a predetermined voltage—e.g., around 4 V.

Alternately, if the USB voltage is higher than the AC voltage, the output of comparator 300 is low. Accordingly, the output of inverter 312 is high, thus enabling the USB_enable line. Each of the AC_enable and USB_enable lines is connected to and can selectively enable charge circuitry that can be utilized to charge a device's battery, as described in FIG. 4.

In at least some embodiments, the PMOS transistor assemblies 302, 304 can be replaced with Zener diodes. Zener diodes can provide a stable voltage and only need one device.

FIG. 4 illustrates charge circuitry in accordance with one or more embodiments generally at 400. In this example, the charge circuitry includes first charge circuitry 210 associated with the AC power supply, and second charge circuitry 212 associated with the USB power supply.

In this particular example, charge circuitry 210 includes a comparator 405, first and second inverters 406, 408 respectively and a pair of PMOS transistors 410, 412. PMOS transistor 410 is gated by the output of inverter 406, and PMOS transistor 412 is gated by the output of inverter 408. A PMOS power transistor 414 is operably coupled to each of PMOS transistors 410, 412 as shown and gated by AC charge control circuits 416 which, in turn, are enabled by the AC_enable line (FIG. 3).

Charge circuitry 212 includes a comparator 417, first and second inverters 418, 420 respectively and a pair of PMOS transistors 422, 424. PMOS transistor 422 is gated by the output of inverter 418, and PMOS transistor 424 is gated by the output of inverter 420. A PMOS power transistor 426 is operably coupled to each of PMOS transistors 422, 424 as shown and gated by USB charge control circuits 428 which, in turn, are enabled by the USB_enable line (FIG. 3).

First and second charge circuitry 210, 212 are operably coupled to a battery PIN 430 through which the battery can be charged.

With reference to both FIGS. 3 and 4, in operation, when the battery charger switching circuit is powered up, comparator 300 (FIG. 3) compares the AC power supply voltage and the USB-port input voltage.

If the AC voltage is greater than the USB voltage, the AC_enable signal will be high and turn on the AC charge control circuits 416 (FIG. 4). Doing so, charging current flows from $V_{AC}$ to the $V_{bat}$ PIN 430 through PMOS power transistor 414. In addition, the bulk of PMOS power transistor 414 is controlled by comparator 405 which compares, in this embodiment, half of $V_{AC}$ and $V_{bat}$. In a charging condition, $V_{AC}$ is larger than $V_{bat}$ and Vb1 will be shorted to the highest potential which, in this case, is $V_{AC}$. The bulk of PMOS power transistor 426 is controlled by comparator 417 which compares half of $V_{USB}$ and $V_{bat}$. Vb2 will be tied to the higher potential between $V_{USB}$ and $V_{bat}$. In this manner, the body diodes associated with PMOS power transistor 426 are reversed biased and thereby prevent leakage current.

If the AC voltage is less than the USB voltage, the USB_enable signal (FIG. 3) will be high and it will turn on the USB charge control circuits 428 (FIG. 4). Doing so, charging current will flow from $V_{USB}$ to the $V_{bat}$ PIN 430 through PMOS power transistor 426. In addition, the bulk of PMOS power transistor 426 is connected to $V_{USB}$ through PMOS transistor 422. The bulk and gate of PMOS power transistor 414 are connected to the higher potential voltage between $V_{AC}$ and $V_{bat}$. This can ensure that PMOS power transistor 414 is completely turned off.

Consider the situation in which both $V_{AC}$ and $V_{USB}$ are zero (meaning that the battery is not being charged) and a good or fully charged battery is connected at $V_{bat}$ PIN 430. In this situation, the gates and the bulk regions of PMOS power transistors 414, 426 are connected to the highest potential $V_{bat}$. Accordingly, both of these transistors will be completely off and no body diode associated either transistor will turn on. This can extend battery life during battery stand-by mode.

Example Method

Figure 5:
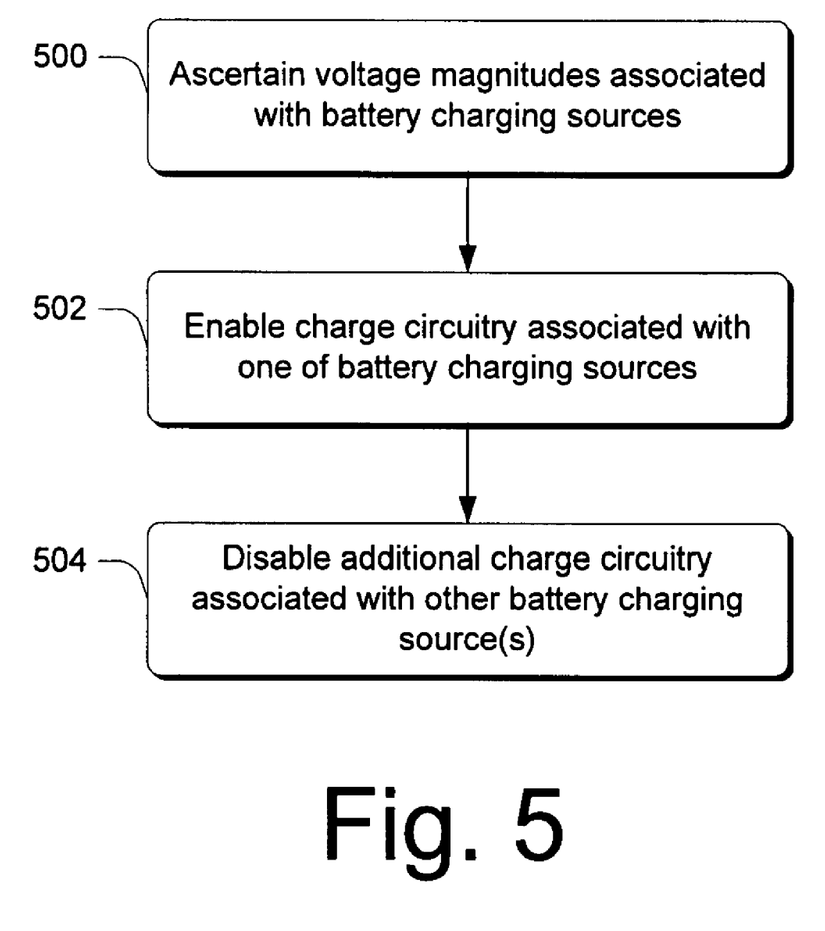
FIG. 5 is a flow diagram that describes steps in a method in accordance with one or more embodiments.

FIG. 5 is a flow diagram that describes steps in a method in accordance with one or more embodiments. The method can be performed in connection with any suitable hardware, software, firmware, or combination thereof. In at least some embodiments, the method can be performed by suitably configured hardware circuitry. Some examples of such circuitry are described above. Other circuitry implementations can be utilized to implement the described method, without departing from the scope of the claimed subject matter.

Step 500 ascertains voltage magnitudes associated with battery charging sources. Examples of how this can be done are provided above. Any suitable number and type of battery charging sources can be used. Two specific examples of battery charging sources are provided above. Step 502 enables, based on the ascertained voltage magnitudes, charge circuitry associated with one of the battery charging sources. Examples of how this can be done are provided above. Step 504 disables additional charge circuitry associated with other battery charging source(s). Examples of how this can be done are provided above.

Having considered an example battery charger switching circuit in accordance with one or more embodiment, consider now some example implementation environments in which the battery charger switching circuit can be employed. Such environments constitute examples only and are not intended to limit the application of the claimed subject matter to any one particular implementation environment. Rather, the claimed subject matter can be employed in implementation environments other than the specific ones described below, without departing from the scope of the claimed subject matter.

Implementation Environments

Figure 6:
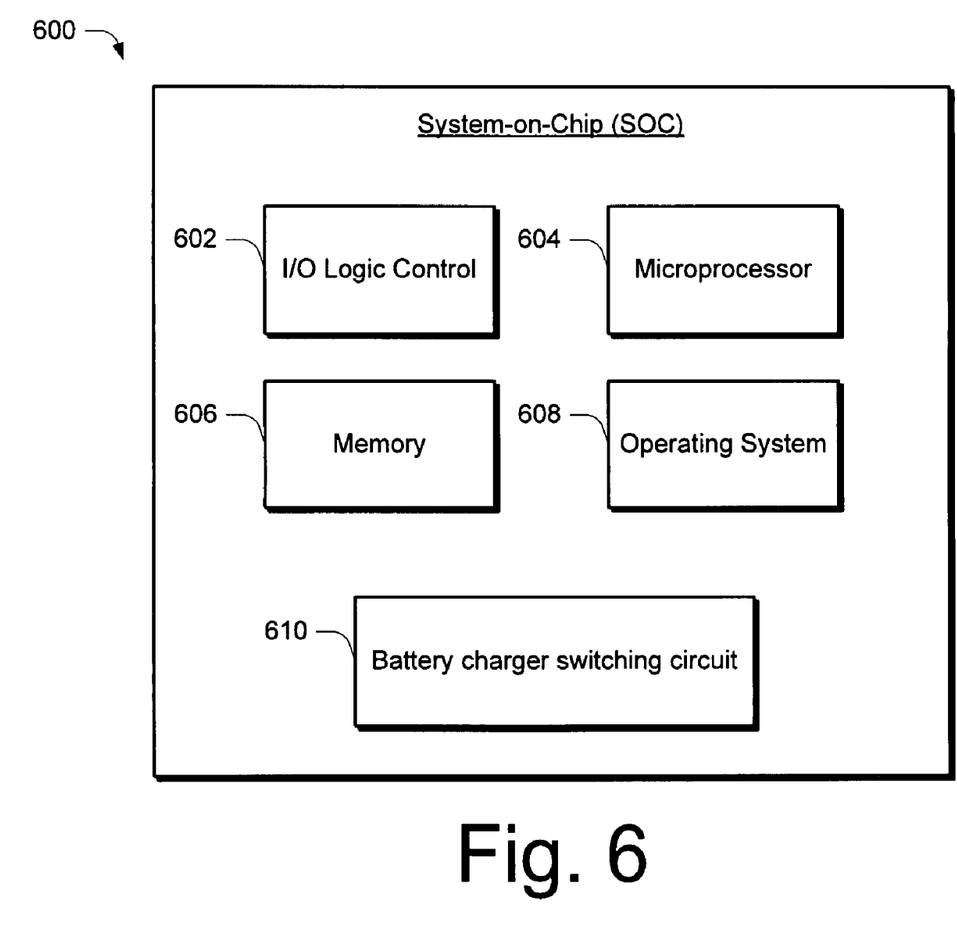
FIG. 6 is a block diagram that describes an example implementation environment in accordance with one or more embodiments.

FIG. 6 illustrates an example system-on-chip (SoC) 600 which can implement various embodiments of the battery charger switching circuit in any type of a consumer electronic device, such as a portable consumer electronic device. An SoC can be implemented in a fixed or mobile device, such as any one or combination of a media device, computer device, telephone (e.g., cellular, VoIP, WiFi, etc.), appliance device, gaming device, electronic device, digital camera, GPS navigation device, and/or in any other type of suitable device.

The SoC 600 can be integrated with electronic circuitry, a microprocessor, memory, input-output (I/O) logic control, communication interfaces and components, other hardware, firmware, and/or software needed to run an entire device. The SoC 600 can also include an integrated data bus that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 600 can also be implemented with any number and combination of differing components.

In this example, SoC 600 includes various components such as an input-output (I/O) logic control 602 (e.g., to include electronic circuitry, generally) and a microprocessor 604 (e.g., any of a microcontroller, digital signal processor, etc.). The SoC 600 also includes a memory 606 which can be any type of random access memory (RAM), a low-latency nonvolatile memory (e.g., flash memory), read only memory (ROM), and/or other suitable electronic data storage. The SoC 600 can also include various firmware and/or software, such as an operating system 608 which can be computer-executable instructions maintained by memory 606 and executed by microprocessor 604. The SoC 600 can also include other various communication interfaces and components, wireless LAN (WLAN) components, other hardware, firmware, and/or software.

SoC 600 also includes a battery charger switching circuit 610 which operates as described above.

Figure 7:
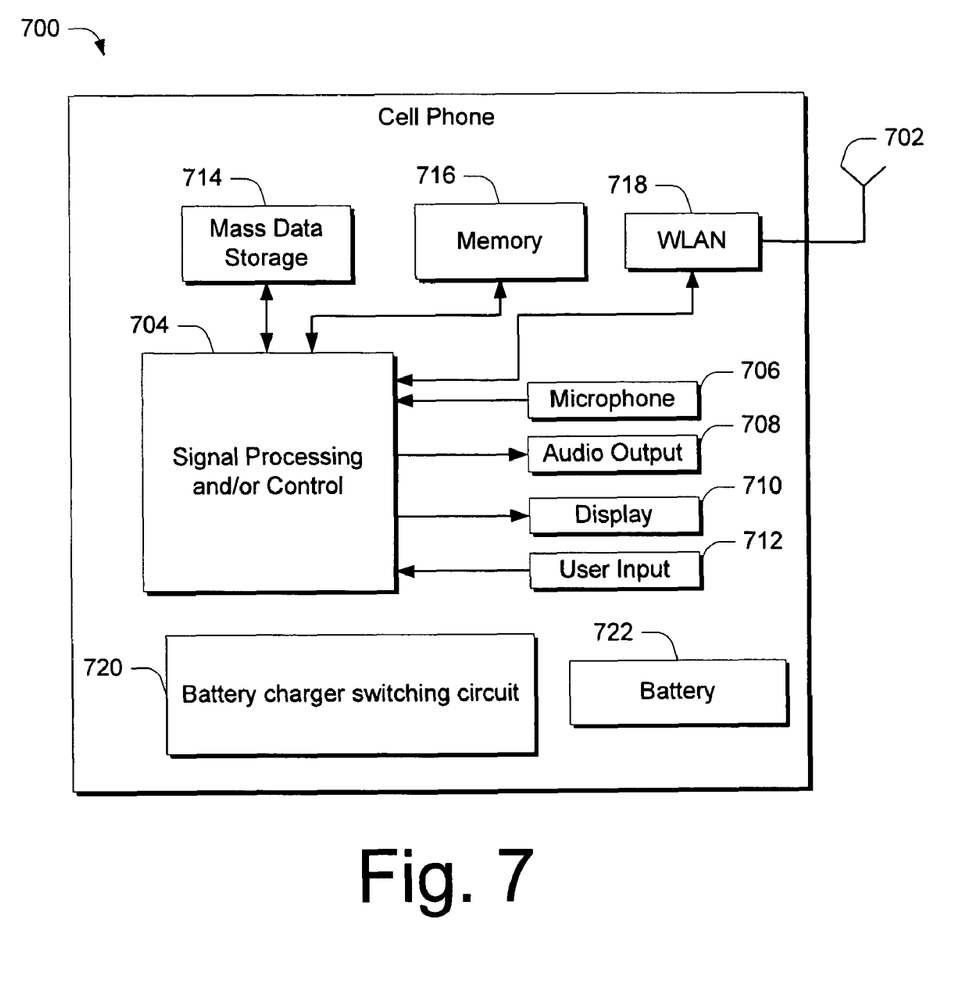
FIG. 7 is a block diagram that describes another example implementation environment in accordance with one or more embodiments.

Referring now to FIG. 7, the battery charger switching circuit may be embodied in a cellular phone 700 that may include a cellular antenna 702. The cellular phone 700 can include either or both signal processing and/or control circuits, which are generally identified in at 704, and a WLAN interface 718 and/or mass data storage 714. In some implementations, cellular phone 700 includes a microphone 706, an audio output 708 such as a speaker and/or audio output jack, a display 710, and/or an input device 712 such as a keypad, pointer, voice actuation device, and/or other input device. Signal processing and/or control circuits 704 and/or other circuits (not shown) in cellular phone 700 may process data, perform coding, decoding and/or encryption, perform calculations, format data, and/or perform other cellular-phone functions.

Cellular phone 700 may communicate with mass data storage 714 that stores data in a nonvolatile manner such as optical and/or magnetic storage devices. Cellular phone 700 may be connected to memory 716 such as RAM, ROM, low latency nonvolatile memory such as flash memory and/or other suitable electronic data storage. Cellular phone 700 also may support connections with a WLAN via WLAN interface 718.

A battery charger switching circuit 720 is provided and can operate as described above to charge a battery 722 in accordance with the principles described herein.

CONCLUSION

In one or more embodiments, a battery charger switching circuit enables a device to automatically select between multiple device interfaces individual ones of which are connectable to different power supplies for recharging the device. In at least some embodiments, selection of a particular device interface is based upon the magnitude of the voltage associated with a particular power supply. For example, the battery charger switching circuit can ascertain charge voltages associated with individual power supplies and select a power supply having a greater magnitude of charge voltage. In at least some embodiments, the battery charger switching circuit can enable charge control circuits associated with a particular power supply and disable charge control circuits associated with unselected power supplies in a manner that reduces or eliminates leakage current associated with unselected power supplies.

Although the subject matter has been described in language specific to structural features and/or methodological acts, the subject matter defined in the appended claims is not necessarily limited to the specific features or acts described above. Rather, the specific features and acts described above are disclosed as example forms of implementing the claims. For example, one or more steps of methods described above may be performed in a different order or concurrently and still achieve desirable results.

What is claimed is:

1. A method comprising:
   ascertaining voltage magnitudes associated with battery charging sources;
   enabling, based on the ascertained voltage magnitudes, a first charge circuitry associated with a first one of the battery charging sources;
   disabling a second charge circuitry associated with a second one of the battery charging sources, the second charge circuitry including a power transistor having a source or a drain operably coupled to the second one of the battery charging sources; and
   preventing current leakage by connecting a bulk of the power transistor to a higher of:
      a voltage associated with the second one of the battery charging sources; or
      a voltage associated with a battery to be charged.

2. The method of claim 1, wherein the charge circuitry that is enabled is configured to enable a lithium-ion battery to be recharged.

3. The method of claim 1, wherein the battery charging sources comprise at least an alternating current (AC) power source or a universal serial bus (USB) power source.

4. The method of claim 1, wherein:
   ascertaining voltage magnitudes comprises comparing voltage magnitudes associated with the battery charging sources; and
   enabling the charge circuitry comprises driving an enable line to enable a charge control circuit.

5. The method of claim 1, further comprising, for at least one of the battery charging sources, clamping a voltage associated with the at least one of the battery charging sources.

6. The method of claim 1, further comprising charging a battery using the charge circuitry that has been enabled.

7. The method of claim 1, wherein the second charge circuitry includes a comparator for comparing the voltage associated with the second one of the battery charging sources with the voltage associated with the battery to be charged.

8. The method of claim 7, wherein the power transistor comprises a PMOS power transistor.

9. The method of claim 7, wherein the comparator is operably coupled to the power transistor and configured to prevent the current leakage by controlling the bulk of the power transistor such that the bulk of the power transistor is connected to the higher of:
   the voltage associated with the second one of the battery charging sources, or
   the voltage associated with the battery to be charged.

10. A battery charger circuit comprising:
    a voltage detection circuitry configured to ascertain voltage magnitudes associated with battery charging sources;
    a first charge circuitry configured to enable a battery to be charged from a first one of the battery charging sources;
    a charge enable circuitry configured to:
       enable, based on the voltage magnitudes ascertained by the voltage detection circuitry, the first charge circuitry associated with the first one of the battery charging sources;
       disable a second charge circuitry associated with a second one of the battery charging sources, the second charge circuitry including a power transistor having a source or a drain operably coupled to the second one of the battery charging sources; and
    a circuitry configured to prevent leakage current by connecting a bulk of the power transistor to the higher of:
       a voltage associated with the second one of the battery charging sources; or
       a voltage associated with the battery to be charged.

11. The battery charger circuit of claim 10, wherein the charge circuitry and the second charge circuitry is configured to enable a lithium-ion battery to be recharged.

12. The battery charger circuit of claim 10, wherein the battery charging sources comprise one or more of at least an alternating current (AC) power source or a universal serial bus (USB) power source.

13. The battery charger circuit of claim 10, wherein:
    the voltage detection circuitry comprises a comparator configured to compare the voltage magnitudes associated with the battery charging sources; and
    the charge enable circuitry comprises a plurality of enable lines configured to enable respective charge control circuits operably coupled to respective charge circuitry.

14. The battery charger circuit of claim 10, further comprising, for at least one of the battery charging sources, a voltage clamp associated with the at least one of the battery charging sources.

15. The battery charger circuit of claim 10, wherein the circuitry configured to prevent leakage current includes a comparator configured to compare the voltage associated with the second one of the battery charging sources with the voltage associated with the battery to be charged.

16. The battery charger circuit of claim 15, wherein the power transistor comprises a PMOS power transistor.

17. The battery charger circuit of claim 15, wherein the bulk of the power transistor is controlled by the comparator such that the bulk is tied to the higher of:
    the voltage associated with the second one of the battery charging sources; or
    the voltage of the battery to be charged.

18. A rechargeable device comprising the battery charger circuit of claim 10.

19. A battery charger circuit comprising:
    means for ascertaining voltage magnitudes associated with battery charging sources;
    means for enabling, based on ascertained voltage magnitudes, a first charge circuitry associated with a first one of the battery charging sources;
    means for disabling a second charge circuitry associated with a second one of the battery charging sources, the second charge circuitry including a power transistor having a source or a drain operably coupled to the second one of the battery charging sources; and means for connecting a bulk of the power transistor to a higher of:
- a voltage associated with the second one of the battery charging sources; or
- a voltage associated with a battery to be charged.

20. The battery charger circuit of claim 19, wherein the second charge circuitry associated with the second one of the battery charging sources includes means for comparing the voltage associated with the second one of the battery charging sources with the voltage associated with the battery to be charged.

* * * * *